(12) United States Patent
Kuhn et al.

(10) Patent No.: US 6,669,848 B2
(45) Date of Patent: Dec. 30, 2003

(54) METHODS OF TREATING COMMERCIAL GRADE PRESERVATIVES TO REMOVE UNDESIRABLE ODORS AND FLAVORS

(75) Inventors: Dale F. Kuhn, Shawnee Mission, KS (US); Bruce E. Plashko, Lawrenceburg, IN (US)

(73) Assignee: Tillin, Inc., Shawnee Mission, KS (US)

( * ) Notice: Subject to any disclaimer, the term of this patent is extended or adjusted under 35 U.S.C. 154(b) by 0 days.

(21) Appl. No.: 10/355,452

(22) Filed: Jan. 31, 2003

(65) Prior Publication Data

US 2003/0141247 A1 Jul. 31, 2003

Related U.S. Application Data

(60) Provisional application No. 60/353,532, filed on Jan. 31, 2002.

(51) Int. Cl.[7] .......................... B01D 11/00; B01D 11/02
(52) U.S. Cl. ...................... 210/634; 210/665; 210/667; 210/683; 210/690; 210/749; 210/767; 210/777; 426/532; 426/654; 422/28
(58) Field of Search .............................. 210/224, 225, 210/263, 266, 506, 634, 638, 639, 644, 702, 749, 767, 783, 806, 665, 667, 668, 669, 683, 690, 691; 426/262, 268, 133 R, 321, 532, 654

(56) References Cited

U.S. PATENT DOCUMENTS

| | | | | |
|---|---|---|---|---|
| 4,073,729 A | * | 2/1978 | Kraemer et al. | |
| 4,092,353 A | * | 5/1978 | Wolf | |
| 4,296,245 A | * | 10/1981 | Jongsma et al. | |
| 4,729,834 A | | 3/1988 | Itoh et al. | 210/670 |
| 5,057,197 A | * | 10/1991 | Perry et al. | |
| 5,330,735 A | | 7/1994 | Cronin et al. | 423/488 |
| 5,522,995 A | * | 6/1996 | Cockrem | |
| 5,759,406 A | | 6/1998 | Phelps et al. | 210/673 |
| 6,123,973 A | * | 9/2000 | Kuhn | |

OTHER PUBLICATIONS

"Dowex Ion Exchange Resins; Powerful Chemical Processing Tools," Dow Chemical Company, Jul. 1998.

* cited by examiner

*Primary Examiner*—Joseph Drodge
(74) *Attorney, Agent, or Firm*—Jeffrey L. Thompson; Thompson & Thompson, P.A.

(57) ABSTRACT

The invention provides processes for treating commercial grade preservatives to remove the off-flavor and/or off-odor from the preservatives. The processes involve preparing a solution by dissolving the preservative in a suitable solvent, such as water or methanol or mixtures thereof. The preservative solution is then passed through a filter to separate and remove organic acid impurities from the preservative. The undesirable tastes and odors, principally caused by the organic acid impurities, are retained in the filter while the preservative passes through the filter. In one embodiment, the filter is a bed of anion exchange resin that reacts with and removes the organic acid impurities. In another embodiment, the filter contains a metal cation that converts the organic acid impurities into insoluble salts which remain in the filter. The solvent can be removed by evaporation after the preservative solution is passed through the filter.

25 Claims, 3 Drawing Sheets

METHODS OF TREATING COMMERCIAL GRADE PRESERVATIVES TO REMOVE UNDESIRABLE ODORS AND FLAVORS

RELATED APPLICATIONS

The Applicant claims priority under 35 U.S.C. §119(e) of provisional U.S. Patent Application Ser. No. 60/353,532 filed on Jan. 31, 2002.

FIELD OF THE INVENTION

The present invention relates generally to methods of treating commercial grade preservatives having offensive odors and/or tastes to remove the off-odors and off-tastes from the preservatives. In particular, the invention relates to methods for removing undesirable tastes and odors from commercial grade preservatives by dissolving the preservative in a solvent and passing the solution through a filter to remove the organic acid impurities.

BACKGROUND OF THE INVENTION

The growth of mold, rope, yeasts and bacteria is a significant problem in packaged or processed foods, cosmetics, personal care products, and pharmaceuticals. The growth of mold, rope, yeasts and bacteria not only significantly reduces the useful shelf life of such products, thus increasing the sellers' direct costs due to stale or moldy products that cannot be sold, but also requires that certain items be refrigerated during shipping and/or at the marketplace, which causes additional indirect expenses for the end seller of the product.

Various preservatives on the market, including commercial grade alkyl parabens and sodium benzoate, are limited in their usefulness because they tend to impart undesirable off-flavors and/or odors to the final product. As a result, the most effective preservatives for a particular product often cannot be used because they would impart undesirable flavors and/or odors. In other cases, the preservative cannot be used at its most effective concentration and must be diluted to minimize the off-flavors and off-odors.

Thus, a need exists for a method of treating commercial grade preservative products to remove the offensive odors and flavors without altering the primary composition and effectiveness of the preservatives.

SUMMARY OF THE INVENTION

The present invention provides novel processes for removing undesirable odors and flavors from commercial grade preservatives. The processes include the steps of: selecting a commercial grade preservative that contains a small amount of organic acid impurities; preparing a solution of the preservative using a solvent in which the preservative is soluble; and passing the preservative solution through a filter that removes the organic acid impurities from the solution.

According to a first embodiment, the filter is a bed of anion exchange resin that separates the organic acid impurities from the solution. According to a second embodiment, the filter contains a metal cation that converts the organic acid impurities into insoluble salts which are then removed from the solution. The solvent used in the process is selected based on what the particular preservative is soluble in. For example, water or methanol or mixtures thereof can be used for the solvent. The undesirable tastes and odors, principally caused by organic acids, are retained in the filter, while the preservative solution passes through the filter. The solvent can be removed from the preservative solution, e.g., by evaporation, after the solution is passed through the filter.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A detailed description of the preferred embodiments of the present invention is provided herein. It is, however, to be understood that the disclosed embodiments are merely illustrative of the invention, which may be embodied in various forms. Therefore, specific structural and functional details disclosed herein are not to be interpreted as limiting, but merely as a basis for the claims and as a representative basis for teaching one skilled in the art to employ the process of the present invention.

Figure 1:
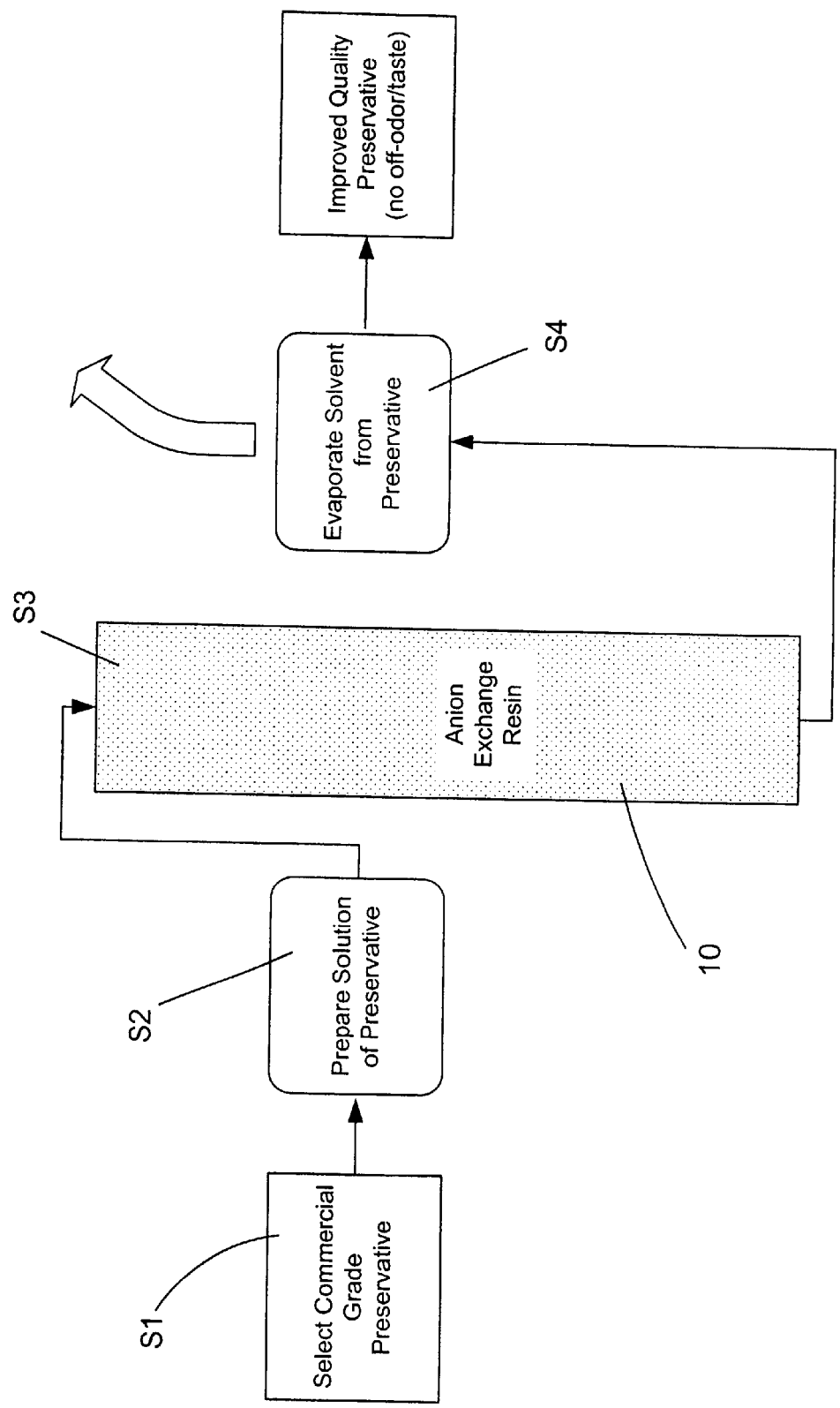
FIG. 1 is a diagram for illustrating the process steps according to a first embodiment of the present invention.

A first embodiment of the present invention provides a novel process for treating commercial grade preservatives using anion exchange resins to remove the off-flavor and/or off-odor from the preservatives. The first step S1 of the process, as shown in FIG. 1, is to select a suitable commercial grade preservative for a particular application. In certain applications, the preservative will preferably be an alkyl paraben selected from the group consisting of methyl paraben, propyl paraben, butyl paraben, ethyl paraben, and mixtures thereof. In other applications, the preservative will preferably be selected from the group consisting of sodium benzoate, calcium benzoate, potassium benzoate, sodium acetate, sodium diacetate, niacin, calcium acetate, and calcium diacetate and mixtures thereof. In still other applications, the preservative will preferably be selected from the group consisting of sodium sorbate, calcium sorbate, potassium sorbate, sodium propionate, calcium propionate, potassium propionate and mixtures thereof. The selection of the commercial grade preservative can be based on criteria well known to those skilled in the art, and will involve, for example, considerations of whether the preservative is compatible with the product to be preserved, the desired shelf life of the product, the environment in which the product will be stored and/or used, and a variety of other considerations. The commercial grade preservatives listed above will normally contain small amounts of organic acid impurities which tend to impart off-flavors and off-odors to the preservatives.

The second step S2 of the process is to prepare a solution of the commercial grade preservative using a solvent in which the preservative is soluble. The solvent will normally be selected from either water or methanol or mixtures thereof. For example, a methanolic solution of methyl paraben can be prepared using a methanol solvent. Other solvents, such as ethanol, may also be used in some applications.

The third step S3 is to pass the preservative solution through a filter 10 that removes the organic acid impurities from the solution. In the first embodiment, the filter 10 is a bed of anion exchange resin which removes the organic acid anion impurities from the solution. The undesirable tastes and odors of the commercial grade preservative, which are principally caused by organic acids, are retained on the resin while the preservative passes through the resin bed. The anion exchange resin is preferably a resin approved for food grade products, such as DOWEX-66™ marketed by The Dow Chemical Company. Other similar resins from other manufacturers would also work. The bed of anion exchange resin may comprise, for example, a cylindrical column containing insoluble resin beads through which the preservative solution can flow.

The fourth step S4 is to remove the solvent from the preservative solution after the solution is passed through the bed of anion exchange resin. The solvent can be removed, for example, by evaporation. The solution can be spray-dried or heated to aid in the removal of the solvent. A methanol solvent will evaporate easily and will generally require less energy for removal from the solution than a water solvent.

Once the solvent is removed from the preservative solution, an improved quality preservative in solid form remains. The solid preservative can be granulated, ground into a powder, or otherwise prepared in a known manner to meet the specifications of a particular application. This first embodiment of the present invention is particularly useful for treating commercial grade alkyl parabens to remove off-odors and off-tastes therefrom. The following example illustrates one of many practical applications of the process according to the first embodiment.

EXAMPLE 1

A methanolic solution of methyl paraben (190 grams/liter) was passed through a three-foot by two-inch column, containing DOWEX-66™ anion exchange resin, at a rate of 10 mL per minute. The methanol was then removed by evaporation to yield an improved quality solid methyl paraben. The resulting product had no detectable off-odor or off-taste. The process conditions of this example can be varied, with more efficient removal of the undesirable properties occurring at lower flow rates. A scaled-up commercial process would employ much larger resin volumes and appropriately increased flow rates.

In some applications, it will not be necessary to remove the solvent from the alkyl paraben solution. For example, where a water soluble sodium benzoate is used as a preservative for a consumable beverage product, the water-based sodium benzoate solution can be incorporated directly into the beverage product.

A second embodiment of the present invention provides a novel process for treating commercial grade preservatives using a metal cation to remove the organic acid impurities from the preservative. More specifically, the second embodiment uses a filter containing a metal cation that reacts with the organic acid anions to create insoluble derivatives of the organic acids, which are then removed from the preservative by the filter.

Figure 2:
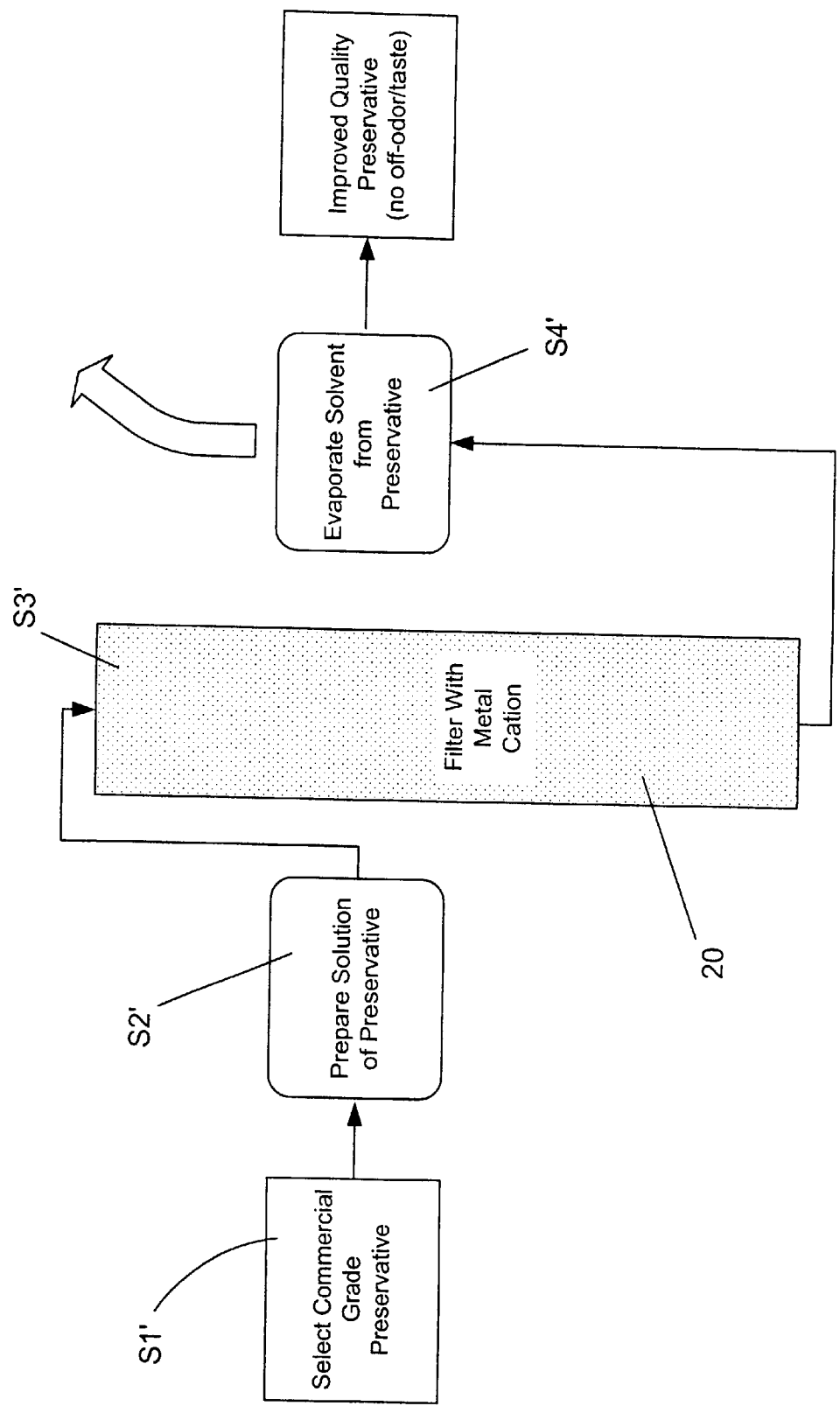
FIG. 2 is a diagram for illustrating the process steps according to a second embodiment of the present invention.

As shown in FIG. 2, the first step S1' of the process according to the second embodiment is to select a suitable commercial grade preservative for a particular application. The preservative can be methyl paraben or sodium benzoate, as in Examples 2 and 3 set forth below. The preservative can also be selected from the group of preservatives consisting of alkyl parabens, sodium benzoate, potassium benzoate, sodium acetate, sodium diacetate, niacin, sodium sorbate, potassium sorbate, sodium propionate, potassium propionate and mixtures thereof. The selection of the commercial grade preservative can be based on criteria well known to those skilled in the art, as described above. The commercial grade preservatives listed above will normally contain small amounts of organic acid impurities which tend to impart off-flavors and off-odors to the preservatives.

The second step S2' of the process is to prepare a solution of the commercial grade preservative using a solvent in which the preservative is soluble. The solvent will normally be selected from either water or methanol or mixtures thereof. For example, a methanolic solution of methyl paraben can be prepared using a methanol solvent, or a water-based solution of sodium benzoate can be prepared by dissolving sodium benzoate in water. Other solvents, such as ethanol, may also be used in some applications.

The third step S3' is to pass the preservative solution through a filter that removes the organic acid impurities from the solution. In the second embodiment, the filter contains a metal cation that reacts with the organic acid anions and converts the organic acid impurities into insoluble salts which are then removed from the solution. The undesirable tastes and odors of the commercial grade preservative, which are principally caused by organic acids, are retained in the filter, while the "purified" preservative passes through the filter.

In the second embodiment, the free organic acids present in the commercial grade preservative are converted into an insoluble salt of the acid, MA, where M is any metal cation that produces an insoluble salt of the acid, and A is the acid anion. In the preferred embodiment and the examples described below, the metal cation used is calcium, Ca. However, any metal cation that produces an insoluble salt, such as magnesium or lead cations, can also be used.

The filter 20 in the second embodiment may comprise, for example, a bed of crushed limestone (calcium carbonate). As the preservative solution is passed through the limestone bed, the calcium reacts with the organic acid anion to produce insoluble calcium salts. The insoluble material produced by this reaction remains on the bed as the solution continues to flow through the bed, thereby removing the organic acid impurities from the solution. Sources of metal cations other than limestone can also be used in this process. The filter may comprise, for example, a cylindrical column containing crushed limestone through which the preservative solution can flow.

Figure 3:
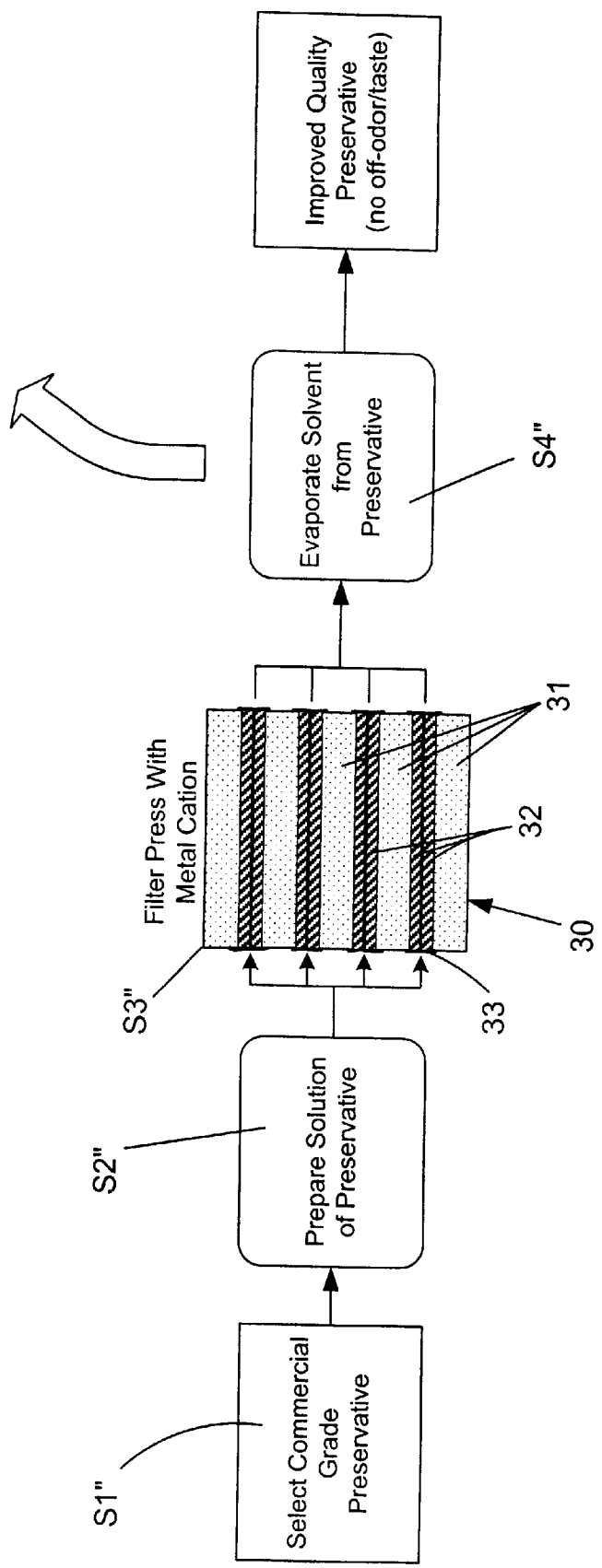
FIG. 3 is a diagram for illustrating the process steps according to a modification of the second embodiment, in which a filter press is used as the filter.

FIG. 3 illustrates a variation of this second embodiment in which the filter is a filter press 30. In this case, the plates 31 of the filter press 30 are precoated with a layer 32 of crushed limestone (or other material containing a suitable metal cation). The crushed limestone layer 32 is covered by a netting or fabric 33 or other porous material to contain the limestone particles in the layer 32. The plates 31 are then clamped together so that the solution passing through the filter press 30 passes through the fabric 33, follows a tortuous path through the crushed limestone layer 32, and passes through the fabric 33 again on the downstream side of the filter press 30. The filter press 30 can be flushed or cleaned by unclamping the plates 31 and washing the exposed surfaces of the fabric 33. The material in the limestone layer 32 must be replenished or replaced periodically to keep the filter press 30 functioning properly. The filter press 30 shown in FIG. 3 would be suitable for large scale processing of commercial grade preservatives using the technology of the present invention.

The fourth step S4' is to remove the solvent from the preservative solution after the solution is passed through the filter 20, 30. The solvent can be removed, for example, by evaporation. The solution can be spray-dried or heated to aid in the removal of the solvent. A methanol solvent will evaporate easily and will generally require less energy for removal from the solution than a water solvent.

Once the solvent is removed from the preservative solution, an improved quality preservative in solid form remains. The solid preservative can be granulated, ground into a powder, or otherwise prepared in a known manner to meet the specifications of a particular application. This second embodiment of the present invention is particularly useful for treating commercial grade alkyl parabens and benzoates to remove off-odors and off-tastes therefrom. The following examples illustrate two of many practical applications of the process according to the second embodiment.

EXAMPLE 2

A commercial grade methyl paraben (190 grams/liter) was dissolved in methanol and passed through a bed of crushed limestone (calcium carbonate). The bed of crushed limestone was contained in a one-inch thick by three-inch diameter column, and the solution was passed through at a flow rate of 10 mL per minute. The methanol was then removed by evaporation to yield an improved quality methyl paraben. The resulting product had no detectable off-odor or off-taste. The process conditions of this example, such as the thickness of the crushed limestone layer, the diameter of the column and the flow rate, can be varied, with more efficient removal of the undesirable properties occurring at lower flow rates. A large scale commercial process would employ a much larger filter bed, such as a filter press whose plates had been precoated with the crushed limestone, to accomplish the filtration at higher flow rates.

EXAMPLE 3

A commercial grade sodium benzoate (900 grams/liter) was dissolved in water and passed through a bed of crushed limestone (calcium carbonate). As in the above example, the bed of crushed limestone was contained in a one-inch thick by three-inch diameter column, and the solution was passed through at a flow rate of 10 mL per minute. The water was then removed by evaporation to yield an improved quality sodium benzoate. The resulting product had no detectable off-odor or off-taste. As with the above example, the process conditions of this example can be varied, with more efficient removal of the undesirable properties occurring at lower flow rates. A large scale commercial process would likely employ a much larger filter bed, such as a filter press whose plates had been precoated with the crushed limestone, to accomplish the filtration at higher flow rates.

The examples 2 and 3 described above for the second embodiment are directed to the preparation of commercial grade alkyl parabens and sodium benzoate. However, it is contemplated that the same process will also be effective on other commercial grade preservatives having trace amounts of undesirable organic acid impurities that react with, and can be removed by, a filter containing metal cations. For example, the commercial grade preservative treated by the process according to the second embodiment of the present invention can also be potassium benzoate, sodium acetate, sodium diacetate, niacin, sodium sorbate, potassium sorbate, sodium propionate, potassium propionate and mixtures thereof.

As used herein, the term "filter" refers to any device or system that causes the organic acid anion impurities to be separated and removed from the preservative solution. For example, the filter can be a bed through which the preservative solution is passed, as in the examples described above. The filter can also be a vat in which the solution is exposed to cations that react with the organic acid impurities to form insoluble to form insoluble salts. The impurities can then be precipitated or otherwise removed from the solution as the vat is emptied.

As used herein, the terms "off taste" and "off flavor" include the numbing effect which is often caused by organic acid impurities in commercial grade preservatives.

While this invention has been described in relation to the preferred embodiments, it is to be understood that various modifications thereof will now be apparent to one skilled in the art upon reading this specification, and it is intended that all such modifications that fall within the scope of the following claims be covered by this application.

What is claimed is:

1. A method of removing undesirable odors and flavors from commercial grade preservatives, comprising the steps of:
   selecting a commercial grade preservative that contains a small amount of organic acid impurities;
   preparing a solution of the preservative using a solvent in which the preservative is soluble; and
   passing the preservative solution through a filter that reacts with and converts the organic acid impurities into insoluble salts and then removes the insoluble salts from the solution by filtration.

2. The method of claim 1, further comprising the step of removing the solvent from the solution after the solution is passed through the filter.

3. The method of claim 2, wherein said step of removing the solvent comprises evaporating the solvent.

4. The method of claim 1, wherein said filter is a bed of anion exchange resin that separates the organic acid impurities from the solution.

5. The method of claim 4, wherein said commercial grade preservative is an alkyl paraben.

6. The method of claim 1, wherein said step of passing the preservative solution through a filter comprises passing the solution through a column containing an anion exchange resin.

7. The method of claim 1, wherein said filter contains a metal cation that converts the organic acid impurities into insoluble salts.

8. The method of claim 7, wherein said metal cation is selected from the group consisting of calcium, magnesium and lead.

9. The method of claim 1, wherein said commercial grade preservative is an alkyl paraben selected from the group consisting of methyl paraben, propyl paraben, butyl paraben, and ethyl paraben and mixtures thereof.

10. The method of claim 1, wherein said commercial grade preservative is selected from the group consisting of sodium benzoate, potassium benzoate, sodium acetate, sodium diacetate, niacin and mixtures thereof.

11. The method of claim 1, wherein said commercial grade preservative is selected from the group consisting of sodium sorbate, potassium sorbate, sodium propionate, potassium propionate and mixtures thereof.

12. The method of claim 1, wherein said solvent is selected from the group consisting of water and methanol and mixtures thereof.

13. A method of inhibiting microbial growth in foodstuffs including creating said foodstuffs by mixing raw ingredients for preparing said foodstuffs with a preservative prepared by the method according to claim 1.

14. A method of removing undesirable odors and flavors from commercial grade preservatives, comprising the steps of:

selecting a commercial grade preservative that contains a small amount of organic acid impurities;

preparing a solution of the preservative using a solvent in which the preservative is soluble: and passing the preservative solution through a filter that removes the organic acid impurities from the solution;

wherein said step of passing the preservative solution through a filter comprises passing the solution through a bed of calcium carbonate to convert the organic acid impurities into insoluble calcium salts that remain on the bed.

15. A method of removing undesirable odors and flavors from commercial grade preservatives, comprising the steps of:

selecting a commercial grade preservative that contains a small amount of organic acid impurities;

preparing a solution of the preservative using a solvent in which the preservative is soluble; and passing the preservative solution through a filter that removes the organic acid impurities from the solution;

wherein said step of passing the preservative solution through a filter comprises passing the solution through a filter press having plates which are precoated with crushed limestone, whereby the organic acid impurities are converted into insoluble calcium salts and removed from the solution by the filter press.

16. A method of removing undesirable odors and flavors from commercial grade preservatives, comprising the steps of:

selecting a commercial grade preservative that contains a small amount of organic acid impurities;

preparing a solution of the preservative using a solvent in which the preservative is soluble; and passing the preservative solution through a filter that removes the organic acid impurities from the solution;

wherein said solvent is methanol.

17. A preservative prepared by a method comprising the steps of:

selecting a commercial grade preservative that contains a small amount of organic acid impurities;

preparing a solution of the preservative using a solvent in which the preservative is soluble; and passing the preservative solution through a filter that reacts with and converts the organic acid impurities into insoluble salts and then removes the insoluble salts from the solution by filtration.

18. The preservative according to claim 17, wherein the filter is a bed of anion exchange resin that separates the organic acid impurities from the solution.

19. The preservative according to claim 17, wherein said filter contains a metal cation that converts the organic acid impurities into insoluble salts.

20. A system for removing undesirable odors and flavors from commercial grade preservatives, comprising:

means for preparing a solution of a commercial grade preservative containing a small amount of organic acid impurities using a solvent in which the preservative is soluble; and a filter having a means for reacting with and converting the organic acid impurities into insoluble salts and then removing the insoluble salts from the preservative solution by filtration.

21. The system according to claim 20, wherein said filter comprises a bed of anion exchange resin that separates the organic acid impurities from the solution.

22. The system according to claim 20, wherein said filter comprises a metal cation contained in the filter that converts the organic acid impurities into insoluble salts.

23. The system according to claim 20, wherein said filter is a filter press having plates which are precoated with crushed limestone, whereby the organic acid impurities are converted into insoluble calcium salts and removed from the solution by the filter press.

24. A method of using a filter press to remove impurities from a solution, comprising the steps of:

selecting a material that chemically reacts with the impurities;

coating at least one plate of the filter press with said material; and passing the solution through the filter press to cause the impurities to chemically react with the material and be removed from the solution.

25. The method according to claim 24, wherein said material is crushed limestone and said impurities are organic acid impurities, whereby the organic acid impurities react with the crushed limestone and are converted into insoluble calcium salts.

* * * * *